Sept. 13, 1955 J. S. PILCH 2,717,655
TRACTOR HAVING MOUNTED ACCESSORY SHIFTABLE TO PERMIT
UTILIZATION OF POWER TAKE-OFF PULLEY
Filed April 11, 1952 2 Sheets-Sheet 1

INVENTOR.
JOHN S. PILCH
BY
*Raymond A. Paquin*
ATTORNEY.

Sept. 13, 1955 J. S. PILCH 2,717,655
TRACTOR HAVING MOUNTED ACCESSORY SHIFTABLE TO PERMIT
UTILIZATION OF POWER TAKE-OFF PULLEY
Filed April 11, 1952 2 Sheets-Sheet 2
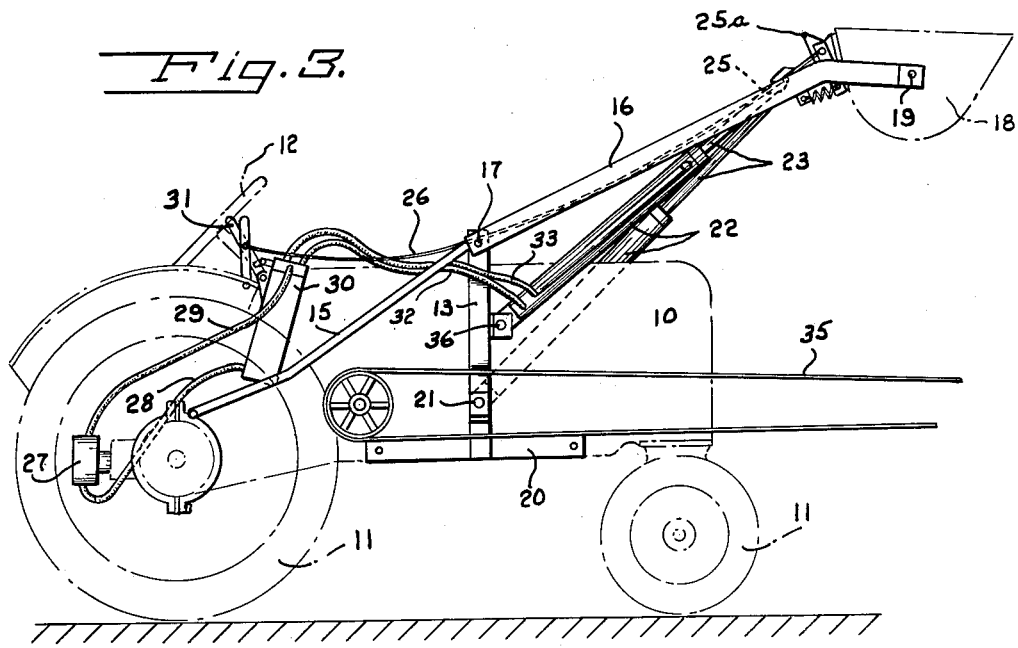
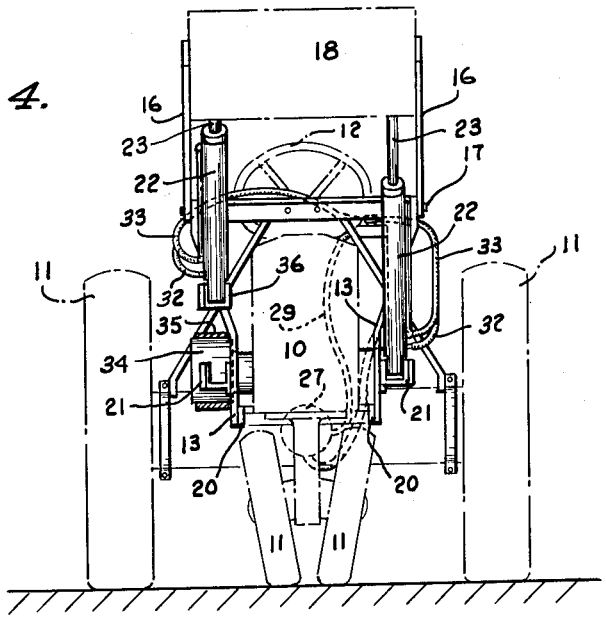
INVENTOR.
JOHN S. PILCH
BY
*Raymond A. Paquin*
ATTORNEY.

United States Patent Office 2,717,655
Patented Sept. 13, 1955

2,717,655

TRACTOR HAVING MOUNTED ACCESSORY SHIFTABLE TO PERMIT UTILIZATION OF POWER TAKE-OFF PULLEY

John S. Pilch, Ware, Mass.

Application April 11, 1952, Serial No. 281,743

4 Claims. (Cl. 180—53)

This invention relates to tractors or the like and has particular reference to a new and improved form of such apparatus which is adapted to be employed as a source of power for both tractor mounted apparatus and for driving other forms of apparatus.

An object of the invention is to provide a new and improved apparatus of the type set forth adapted for use as a stationary source of supply and also for operating tractor mounted accessories such as loaders or the like and particularly to such device and apparatus wherein the tractor may be employed for either purpose without the necessity of removing the tractor mounted accessories therefrom and wherein the tractor mounted apparatus may be so positioned as not to interfere with the use of the tractor as a stationary source of power.

Another object of the invention is to provide a new and improved device of the type set forth whereby the tractor mounted apparatus may be quickly and easily positioned in operative position relative to the tractor or positioned out of operative position so as not to interfere with the use of the tractor as a stationary engine.

Another object is to provide means whereby the tractor mounted apparatus such as a loader, whereby the parts thereof which might interfere with the use of the tractor as a stationary power source, will be retained out of interfering position.

Another object of the invention is to provide new and improved means for a tractor having a loader or the like carried thereby, whereby the tractor may be used either for operation as a stationary source of power or to operate the loader mechanism by adjustment of a part of the loader mechanism to retain said mechanism and loader in such position that they will not interfere with such use of the tractor as a source of power.

Other objects and advantages of the invention will be apparent from the following description taken in connection with the accompanying drawings and it will be understood that changes may be made in the details of construction and arrangement of parts without departing from the scope of the invention as set forth in the accompanying claims.

Referring to the drawings:

Fig. 3 is a side view of the apparatus generally similar to Fig. 1, but showing the apparatus in use as a power supply; and Fig. 4 is a front view of the apparatus of Fig. 3.

Figure 2:
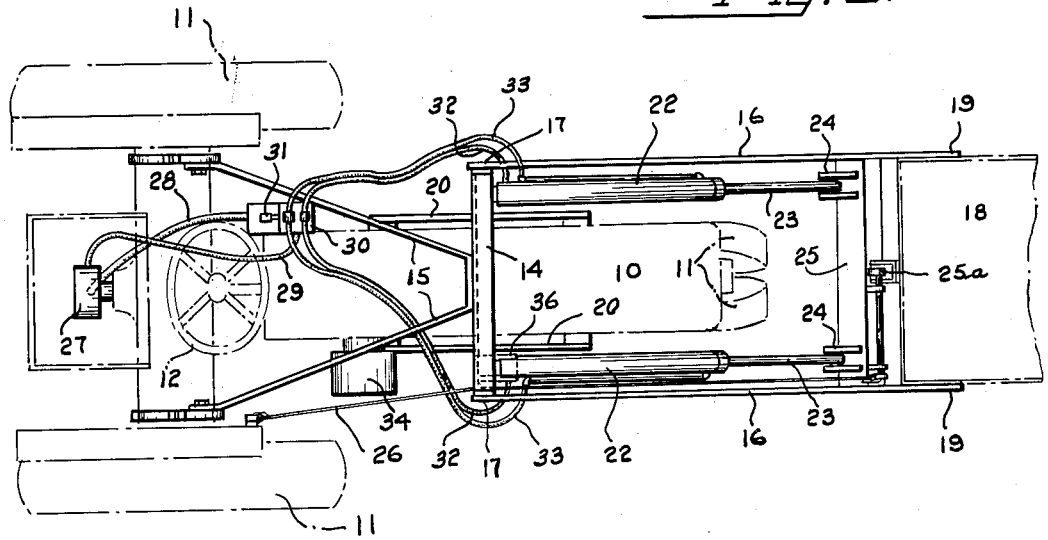
Fig. 2 is a top or plan view of the apparatus shown in Fig. 1.

Referring more particularly to the drawings wherein similar reference characters denote corresponding parts throughout, the invention is shown applied to a wheel type tractor having the engine 10, wheels 11, and steering wheel 12.

The tractor is provided with the upright supports 13 on the opposite sides of engine 10 and connected by the cross member 14 which is reinforced by the angled struts 15 to steady the loader mechanism. Because of the angled struts 15, only a single upright 13 is required on each side of engine 10.

The loader push arms 16 are pivotally connected at the opposite ends of cross member 14 at 17 and are also pivotally connected to the loader bucket 18 at 19.

Each of the uprights or supports 13 is secured at its lower end to a support 20, one of which is secured on each side of the tractor frame, and on each of supports 13 is the pivotal connection 21 to which is pivotally mounted the adjacent end of one of the loader push arms raising and lowering cylinders 22 in each of which is positioned a piston connected to rams 23, which at their free ends are pivotally connected at 24 to support 25 which is secured at its opposite ends to the push arms 16, whereby the push arms 16 and bucket 18 may be raised and lowered by means of cylinders 22 and rams 23. The pivots or hitches 21 are so positioned as to be straddled by belt 35 as shown in Fig. 3. This hitch must be sufficiently low as to give sufficient power yet high enough to give necessary lift which requires its positioning in the vicinity of belt 35. Upper or top hitch 36 can be employed for light loading but would not allow sufficient power for all purposes if used permanently.

Catch 25a and cable 26 are provided for tripping bucket 18.

For actuating the pistons within cylinders 22, the hydraulic pump 27 is provided which is connected by hydraulic lines 28 and 29 to the hydraulic fluid tank and valve 30 and said valves are adapted to be actuated by means of control lever 31.

Valve 30 is connected by hydraulic lines 32 and 33 to the opposite ends of each of cylinders 22 and the fluid supplied through lines 32 and 33 is adapted to actuate the pistons within the cylinders for raising or lowering the push arms 16, as previously stated. The hoses or lines 32 and 33 are connected to the sides of cylinders 22 so as not to interfere with belt 35.

The tractor is also provided with the pulley 34 which is driven by the tractor engine 10 and by means of belt 35, the tractor engine may be employed as a stationary power source for driving other forms of apparatus.

With the apparatus as previously employed, it was necessary to remove the loader mechanism to allow the tractor to be used as a stationary power source because of the interference of cylinders 22 with belt 35, as shown in dotted lines in Fig. 3, which required practically complete disassembly of the apparatus when it was desired to use the apparatus as a stationary power source, and practically complete reassembly of the apparatus for use thereof as a loader. It will be readily seen that such disassembly and reassembly of the loader mechanism was time consuming and involved considerable work, most of which is eliminated by the present invention.

In the present invention, the support 13, on the same side of the engine 10 as the pulley 34, is provided with a second pivotal support 36 which is above pivot 21 to an extent that it is above the normal position of belt 35, as shown in Fig. 3.

Figure 1:
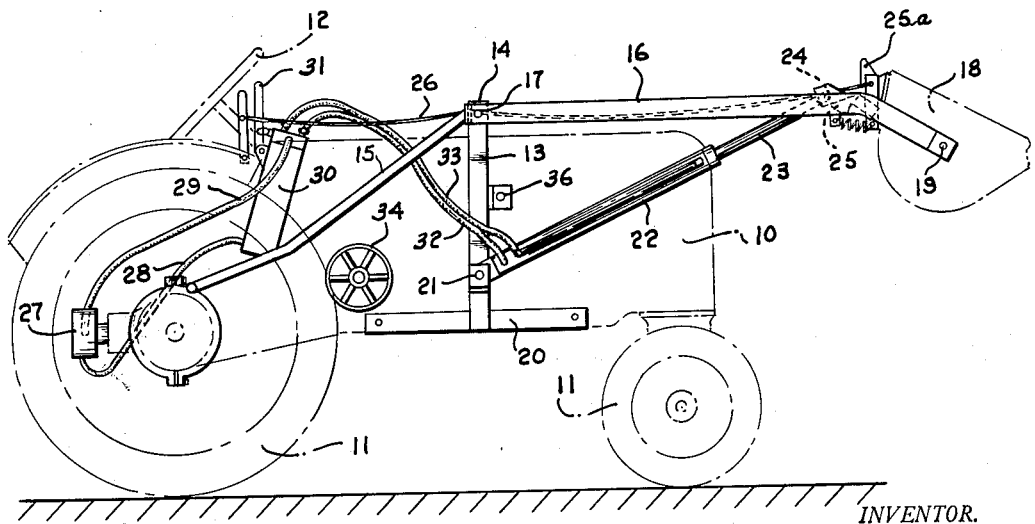
Fig. 1 is a side view of a form of apparatus embodying the invention.

It will be seen from the foregoing that when it is desired to use the tractor as a stationary source of power, that it is only necessary to change the pivotal connection of the cylinder 22 on the same side of engine 10 as pulley 34, from pivotal connection 21 to the upper pivotal connection 36 and then by utilizing the hydraulic system for operating the loader, the cylinders 22 and rams 23 can be utilized to raise the loader mechanism to the position shown in Figs. 3 and 4 at which position it cannot interfere with the belt 35 nor the use of the tractor as a power supply by mounting belt 35 over pulley 35, as shown in Fig. 3, and when the use of the tractor as a source of power has ceased and it is desired again to utilize the tractor for operating the loader, it is only necessary to reposition the pivotal connection of the cylinder 22 from raised pivotal connection 36 to lower or operative pivotal connection 21, as shown in Fig. 1.

It will be seen from the foregoing that with the present invention, the apparatus can be used as a loader or a stationary source of power with very little difficulty, work, or loss of time.

If desired, the raised pivotal connection 36 could be provided on both sides of engine 10 but have not been found necessary.

It will also be understood that the invention is applicable to other forms of tractor mounted apparatus and accessories than loaders, and also that the invention is capable of being employed with other types of tractors than that shown and described.

From the foregoing, it will be seen that I have provided simple, efficient, and economical means for obtaining all of the objects and advantages of the invention.

I claim:

1. In a device of the character described, a tractor, said tractor having a source of power, a hydraulic pump operatively connected to said source of power, a pulley on said tractor and adapted to be operated by said source of power whereby said tractor may be utilized as a stationary source of power, an accessory carried by said tractor, hydraulic means for actuating said accessory, a first connection for connecting said hydraulic means on said tractor for the actuation of said accessory said hydraulic means being in position to interfere with the use of said pulley to drive a belt when said hydraulic means is connected to said first connection, and a second connection on said tractor for connecting said hydraulic means on said tractor when said pulley is being utilized, whereby when said tractor is utilized as a stationary source of power said hydraulic means is secured to said second connection to thereby retain said accessory out of interfering position with said pulley driven belt, said second connection being above said pulley and said first connection.

2. In a device of the character described, a tractor, said tractor having a source of power, a hydraulic pump operatively connected to said source of power, a pulley on said tractor and adapted to be operated by said source of power whereby said tractor may be utilized as a stationary source of power, an accessory carried by said tractor and movable relative thereto, hydraulic means for actuating said accessory, a first pivotal connection for said hydraulic means on said tractor, said hydraulic means being in position to interfere with the use of said pulley to drive a belt when said hydraulic means is connected to said first connection, and a second pivotal connection on said tractor for said hydraulic means whereby when said tractor is utilized as a stationary source of power said hydraulic means is secured to said second connection to thereby retain said accessory out of interfering position with said pulley driven belt, said second connection being above said pulley and said first connection.

3. In a device of the character described, a tractor, said tractor having a source of power, a hydraulic pump operatively connected to said source of power, a pulley on a side of said tractor and adapted to be operated by said source of power and mounted on one side thereof whereby said tractor may be utilized as a stationary source of power, an accessory carried by said tractor and movable relative thereto, hydraulic means for actuating said accessory, first connections on the side of said tractor for said hydraulic means for actuating said accessory, said hydraulic means being in position to interfere with the use of said pulley to drive a belt when said hydraulic means is connected to said first connection, and a second connection on the same side of said tractor as said pulley, said second connection for said hydraulic means being at a higher position than said pulley and said first connections whereby when said tractor is utilized as a stationary source of power said hydraulic means is secured to said second connection to thereby retain said accessory out of interfering position with said pulley driven belt.

4. In a device of the character described, a tractor having a source of power, said tractor having a pulley on one side thereof and operatively connected to said source of power whereby said tractor may be utilized as a stationary source of power, a pair of supports on the opposite sides of said tractor for supporting a tractor operated accessory on said tractor, an accessory connected to said supports, hydraulic means for actuating said accessory, said hydraulic means being pivotally connected to each of said supports, said hydraulic means being in position to interfere with the use of said pulley to drive a belt when said hydraulic means is connected to said first connection, and a second pivotal connection for said hydraulic means on said support on the same side of said tractor as said pulley, said second pivotal connection being at a point above said pulley and employed only when said tractor is employed as a stationary source of power whereby said accessory will at that time be retained out of interfering position with said pulley driven belt.

References Cited in the file of this patent

UNITED STATES PATENTS

| Number | Name | Date |
|---|---|---|
| 1,585,818 | Barber | May 25, 1926 |
| 1,644,765 | Wilson | Oct. 11, 1927 |
| 2,103,543 | McCormick et al. | Dec. 28, 1937 |
| 2,114,706 | Espeland | Apr. 19, 1938 |
| 2,353,949 | Warren | July 18, 1944 |
| 2,469,007 | Siebring | May 3, 1949 |
| 2,495,143 | Simmonds | Jan. 17, 1950 |
| 2,495,144 | Simmonds | Jan. 17, 1950 |
| 2,526,954 | Kucera | Oct. 24, 1950 |
| 2,535,727 | Dingley | Dec. 26, 1950 |